United States Patent Office 3,579,551
Patented May 18, 1971

3,579,551
PRODUCTION OF CARBOXYLIC ACIDS
John H. Craddock, Ballwin, and Arnold Hershman, Creve Coeur, Mo., Frank E. Paulik, Houston, Tex., and James F. Roth, Creve Coeur, Mo., assignors to Monsanto Company, St. Louis, Mo.
No Drawing. Filed Aug. 15, 1968, Ser. No. 752,795
Int. Cl. C08h 17/36
U.S. Cl. 260—413
27 Claims

ABSTRACT OF THE DISCLOSURE

The present invention relates to a process for the preparation of carboxylic acids, specifically by the reaction of ethylenically unsaturated compounds with carbon monoxide and water, in the presence of catalyst compositions essentially comprising iridium compounds and complexes, together with an iodide promoter.

This invention relates to a process for the preparation of carboxylic acids. More particularly, it relates to a process for the reaction of ethylenically unsaturated compounds with carbon monoxide and water in the presence of catalyst compositions essentially comprising iridium compounds and complexes and an iodide promoter to yield carboxylic acids selectively and efficiently.

Processes for the preparation of carboxylic acids from olefins, and other ethylenically unsaturated compounds, carbon monoxide and water are well known in the art and have been directed to the production of carboxylic acids and ester derivatives. The prior art teaches the use of a number of catalysts for the synthesis of carboxylic acids by reaction of olefins with carbon monoxide and water at elevated temperatures and pressures. Catalysts such as phosphoric, boric, arsenic and monochloroacetic acids; acetyl chloride on active carbon; boron trifluoride; barium and calcium halides; salts and carbonyls of nickel and cobalt, especially halides; and in general, the Group VIII metals, and simple salts, carbonyls and complexes; have been reported to function for the production of carboxylic acids and esters by reaction of olefins and carbon monoxide in the presence of water or other hydroxylic compounds at temperatures from 130° C.–375° C. and pressures up to 1,000 atmospheres. However, even under such severe conditions the yields of acid were substantially poor, and, therefore, uneconomical. Somewhat less severe reaction conditions of temperature and/or pressure have been reported in the literature employing specific catalyst compositions, e.g., 200° C. to 300° C. and 150 to 200 atmospheres in the presence of 87% phosphoric acid; 300° C. to 375° C. and 450 to 740 atmospheres in the presence of nickel carbonyl promoted by nickel chloride and hydrochloric acid; or 85° C. to 250° C. and 100 to 1,000 atmospheres in the presence of palladium phosphine complex catalysts.

Even using the prior art specific catalyst compositions and reaction conditions, substantially poorer yields of the desired carboxylic acid product and substantially slower reaction rates are obtained than those achieved in the process of this invention.

Certain disadvantages present in the carbonylation processes described in the prior art are catalyst instability, lack of product selectivity, and low levels of catalyst reactivity. One particular disadvantage of olefin carbonylation processes of the prior art is their dependence upon the use of catalysts comprised of metal carbonyls or certain modified metal carbonyls including dicobalt octacarbonyl, iron carbonyl and nickel carbonyl, all of which require the use of high partial pressures of carbon monoxide to remain stable under the necessarily high reaction temperatures employed. For example, dicobalt octacarbonyl requires partial pressures of carbon monoxide as high as 3,000 p.s.i.g. to 10,000 p.s.i.g. under normal carbonylation conditions of 175° C. to 300° C.

Still another disadvantage of carbonylation processes for ethylenically unsaturated compounds disclosed in the prior art is their relatively low level of activity. This low level of activity requires higher catalyst concentrations, longer reaction times, higher reactor pressures, and higher temperatures to obtain substantial reaction rates and conversions. Consequently, very large and costly processing equipment is required.

Another disadvantage of carbonylation processes disclosed heretofore, which employ feedstocks having ethylenically unsaturated linkages, is their inability to maintain high selectivity to the desired carboxylic acid at temperatures required for high conversion levels and high reaction rates. At these higher temperatures undesirable by-products comprising substantial amounts of ethers, aldehydes, higher carboxylic acids and alcohols, carbon dioxide, methane and water are formed, thereby resulting in substantial yield losses and necessitating additional product purification and recycle steps in the processing.

It is, therefore, an object of the present invention to overcome the above disadvantages and thus provide an improved and more economically and commercially feasible carbonylation process for the production of organic acids from ethylenically unsaturated compounds, in liquid phase and vapor phase processes.

Another object of this invention is to provide a more reactive and more stable carbonylation catalyst composition than has been heretofore described in the prior art.

Still another object of the present invention is to provide a more selective and more reactive carbonylation catalyst composition for the production of carboxylic acids from ethylenically unsaturated compounds.

Another object of the present invention is to provide a carbonylation catalyst composition which results in the production of a higher yield of the desired carboxylic acid with no substantial formation of ethers, aldehydes, higher carbon number carboxylic acids and alcohols, carbon dioxide, methane, water and other undesirable by-products.

Still another object of the present invention is the provision of an improved carbonylation process enabling the efficient and selective production of carboxylic acids by reaction of ethylenically unsaturated compounds with carbon monoxide and water in the presence of an improved and more stable catalyst, thus enabling the use of lower catalyst concentration, lower temperature, lower pressure, and shorter contact time than has been generally possible heretofore and facilitating product isolation, catalyst recovery and recycle without substantial catalyst decomposition and loss. The present catalyst may be employed using a solution of the catalyst (liquid phase operation) or a solid catalyst (vapor phase operation).

In accordance with the present invention, ethylenically unsaturated compounds are converted selectively to carboxylic acids by reaction in the liquid phase or vapor phase with carbon monoxide and water at temperatures from about 50° C. to 300° C., preferably 125° C. to 225° C., and at partial pressures of carbon monoxide from 1 p.s.i.a. to 15,000 p.s.i.a., preferably 5 p.s.i.a. to 3,000 p.s.i.a. and more preferably 25 p.s.i.a. to 1,000 p.s.i.a. although higher pressure may be employed, in the presence of a catalyst system comprised of an iridium containing component, and a promoter portion, i.e., an iodide. The iodide may be derived from iodine or iodine compounds. The present process is particularly advantageous at lower pressures, although higher pressures may also be used.

As referred to above, for the purpose of the present invention, the catalyst as charged to the reactor is a solution containing an iridium component, an iodide (or iodine) promoter, and other moieties if desired. The catalyst essentially includes an iridium component, as the active component, such as $IrCl_3$, $IrBr_3$, $Ir_2(CO)_4Br_2$, $IrI_3$, $Ir[(C_6H_5)_3P]_2(CO)Cl$, $Ir[(C_6H_5)_3P]_2(CO)Cl(CH_3I)$, etc.; however, the catalyst may be composed of two distinct components, namely, the active catalyst portion, e.g., the aforesaid iridium compound, as the first component, and a promoting portion as the second component. The promoter portion of the catalyst system may or may not be catalytically active in itself, but promotes the reaction in various ways, such as by facilitating formation of the carbon-metal sigma bond, or by rendering the iridium species less volatile than the unmodified iridium carbonyl.

The active catalytic portion or first component of the catalyst is prepared from iridium species such as iridium metal, simple iridium salts, organoiridium compounds, and coordination compounds of iridium, specific examples of which may be taken from the following partial list of suitable compounds:

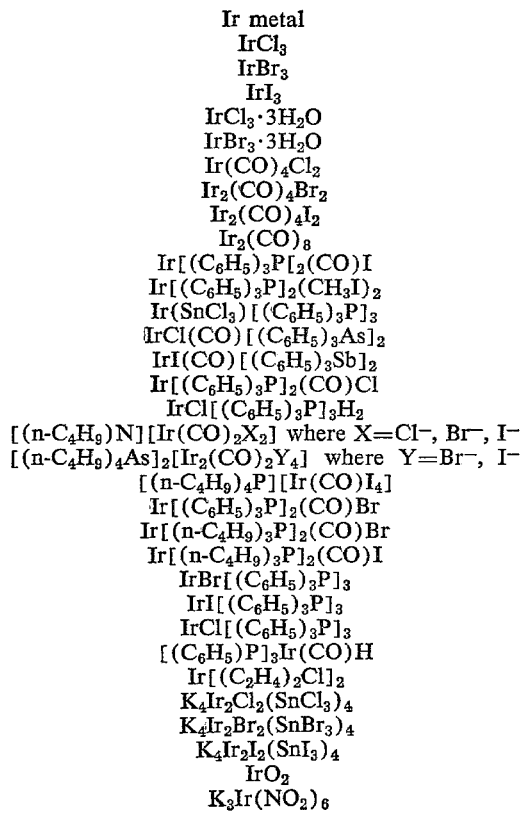

$$Ir(CO)_2(CH_3\underset{\underset{O}{\|}}{C}CH_2\underset{\underset{O}{\|}}{C}CH_3)$$

However, a preferred embodiment of the primary component of the catalyst system of this invention is a coordination compound of iridium, carbon monoxide, and a halide such as chloride, bromide and iodide, as well as suitable amine, organo-phosphine, organo-arsine, and/or organo-stibine ligands and, if desired, other ligands, e.g., halide such as chloride, iodide and bromide and trihalostannate such as the corresponding chloride, bromide or iodide, necessary to satisfy the coordination number or organo-stibine ligands and, if desired, other ligands, and thus form a coordination compound or complex of iridium such as $Ir_2(CO)_4I_2$, $Ir[(C_6HN_5)_3P]_2(CO)Cl$, or $[(C_6H_5)_3P]_3IrI_3$, etc. The term coordination compound or coordination complex used throughout this specification means a compound or complex formed by combination of one or more electronically rich molecules or atoms capable of independent existence with one or more electronically poor molecules or atoms, each of which may also be capable of independent existence. Suitable organo-nitrogen, organo-phosphorus, organo-arsenic, and organo-antimony ligands which may comprise part of the iridium coordination compound or other catalyst of this invention are those consisting of tertiary organo-nitrogen, organo-phosphorus, organo-arsenic, and organo-antimony compounds in which the nitrogen, arsenic, phosphorus, and antimony atoms are trivalent and are referred to in this specification as amines, phosphines, arsines, and stibines, respectively. In the group of suitable ligands containing the trivalent nitrogen, phosphorus, arsenic, and antimony atoms employed in the catalyst of this invention, the individual nitrogen, phosphorus, arsenic, and antimony atom has one available or unshared pair of electrons. An organic derivative of trivalent nitrogen, phosphorus, arsenic, and antimony with the foregoing electronic configuration is, therefore, a suitable ligand for the iridium containing catalyst of this invention. Organic radicals of any size and composition may be bonded to the nitrogen, phosphorus, arsenic, and antimony atoms, and the radicals are selected from the group consisting of alkyl and aryl groups. However, the preferred amine, phosphine, arsine, and stibine ligands are those consisting of at least one, but preferably one to three aryl-and/or aryloxy-groups as the organic moieties. For example, preferred ligands are illustrated by the following structural formula and examples:

$MR_3$ where M=N, P, As, Sb and
R=phenyl ($C_6H_5$—), phenoxy ($C_6H_5$—), tolyl

[$CH_3(C_6H_5)$—]

n butyl(n—$C_4H_9$—), e.g., $N(n—C_4H_9)_3$, $P(C_6H_5)_3$, $P(C_6H_5O)_3$, $As(C_6H_5)_3$, $Sb(C_6H_5)_3$, $P[CH_3(C_6H_5)]_3$ A preferred group of ligands associated with the iridium and the organic phosphorus, arsenic, and antimony derivatives has alkyl radicals of 1 to 18 carbon atoms, aryl radicals having from 6 to 18 carbon atoms and halogen radicals selected from the group consisting of chlorine, bromine and iodine. A preferred catalyst is composed of an iridium atom having as ligands, carbon monoxide, and at least one halogen ligand selected from the group consisting of chlorine, bromine and iodine, and at least two ligands selected from the group consisting of phosphorus, arsenic, and antimony derivatives having alkyl radicals of from 1 to 18 carbon atoms or aryl radicals having from 6 to 18 carbon atoms.

A particular advantage of the iridium carbonyl phosphine chloride compounds, such as $Ir(CO)[P(C_6H_5)_3]_2Cl$ when used as the first component of the catalyst system of this invention is their unusual stability. These compounds are stable at high temperature even in a vacuum. Certain carbonylation catalyst systems described in the prior art such as cobalt carbonyl often undergo substantial decomposition under conditions necessary for product isolation, catalyst recovery, and recycle processing and are, therefore, not suitable for the process of this invention.

The promoting portion or second component of the catalyst system as discussed herein consists of iodide and may be supplied as the free halogen or halogen compound such as hydrogen halide, alkyl- or aryl-halide (preferably having the same number of carbon atoms as the feedstock), metal halide, ammonium, phosphonium, arsonium, stibonium halide, etc., and may be the same or different from any halogen component already present in the precursor iridium component of the catalyst system. Iodine or iodide compounds are suitable for the promoter portion of the catalyst, but those containing iodide are preferred, with hydrogen iodide constituting a more preferred member. Accordingly, suitable compounds providing the promoter portion of the catalyst system of this invention may be selected from the following list of preferred iodine and/or iodine containing compounds:

$$RI_n \text{ (} n \text{ is 1-3)}$$

where

R=any alkyl-, alkylene or aryl-group e.g., $CH_3I$, $C_6H_5I$, $CH_3CH_2I$, $ICH_2CH_2I$, etc.

Other examples include $I_2$; $I_3^-$; HI; and

where

R=any alkyl- or aryl-group e.g.,

$R_4MI$, $R_4MI_3$, or $R_3MI_2$
where

R=hydrogen or any alkyl- or aryl group, e.g., $NH_4I$, $PH_4I_3$, $PH_3I_2$,
M=N, P, As or Sb $(C_6H_5)_3PI_2$, and/or combinations of R, M and I The promoter portion or second component of the catalyst may alternatively be charged to the reaction separately from the active catalyst or first component, or it may be incorporated into the active component, e.g., $$Ir(CO)I[(C_6H_5)_3P]_2 \text{ or } IrI_3.$$

The preparation of the active catalyst complex which includes both iridium and iodide promoter components may be accomplished by a variety of methods. However, it is thought that a substantial port of the precursor medium component is converted to the monovalent state during the preparative treatment. In general, in the process of this invention, it is preferable to preform the active carbonylation catalyst system which contains both iridium and iodide promoter components. For example, to prepare the catalyst system, the first component of the catalyst system, e.g., finely divided iridium metal (powder), a simple iridium salt or iridium compound as a precursor is dissolved in a suitable medium, and carbon monoxide is bubbled through the above iridium solution, preferably while maintaining gentle heating and stirring of the iridium solution. Then an acidic solution of the desired promoter source is added to form an active catalytic solution containing the necessary iridium and iodide promoter components.

Generally, the active catalyst containing the iridium and promoter components of the catalyst system of this invention may be preformed prior to charging the reactor, or it may be formed in situ in the reactor as discussed above. For example, to prepare the catalyst system, the first component of the catalyst system, e.g., an iridium salt such as $IrCl_3 \cdot 3H_2O$ is dissolved in a suitable solvent such as 2-methoxyethanol. Subsequently, carbon monoxide is bubbled through the solution where an intermediate, such as the dimer $[Ir(CO)_2Cl]_2$, is produced wherein the iridium is in the monovalent state. The second or promoter component is, for example, added to the above solution; e.g., as aqueous HI, elemental iodine, alkyl iodide (with alkyl radicals of 1 to 30 carbon atoms) or other iodine containing compound.

Alternatively, the iridium precursor, e.g., $Na_2IrCl_6$, $Na_2IrBr_6$ or $[Ir(CO)_2Cl]_2$, may be dissolved in 2-methoxyethanol containing a dilute aqueous acid, e.g., HCl, acetic acid, etc., as solvent. Then the solution of the iridium compound is heated, for example, to 60° C.–80° C., or in general at a temperature below the boiling point of the solvent, with stirring. A reducing agent such as carbon monoxide is bubbled through the said solution to obtain the iridium component at least in part in the monovalent state. Subsequently, the iodine promoter is added as described herein, although the iodine containing promoter may also be added first.

Another embodiment of the present invention employs compounds of monovalent iridium initially, wherein the transformation to active catalyst may not involve a change of valence. For example, monovalent iridium salts such as $Ir[(C_6H_5)_3P]_3Cl$, $[Ir(C_6H_5)_3P]_2(CO)Cl$, $$[Ir(C_6H_5)_3P]_3(CO)H$$

and $[Ir(CO)_2Cl]_2$ are dissolved in a suitable solvent that is preferably warmed and stirred. Subsequent addition of an acidic solution of the halogen promoter, e.g., alkyl iodide, elemental iodine, aqueous HI, etc., results in formation of an active carbonylation catalyst solution.

Alternate embodiments of the present invention include use of other iridium components in various oxidation states and ligand environments, e.g., iridium metal (zero valence state), iridium salts, e.g., $IrCl_3$ (+3 valence state), other iridium compounds, e.g., iridium acetylacetonate (+3 valence state), etc.; with suitable chemical reagents to accomplish the desired transformation of the iridium precursor to an active catalytic complex species. Such reagents include reducing agents, e.g., hydrogen, carbon monoxide, hydrazine, formic acid, phenyl-hydrazine, etc.; and oxidizing agents, e.g., elemental halogens ($I_2$ or $Br_2$), mineral acids (HCl, HBr, $HNO_3$, HI), peroxides ($H_2O_2$, cumene hydroperoxide, etc.).

This catalytic solution containing the necessary iridium and iodide components is then ready for use as discussed above, and may be employed as a liquid phase or vapor phase catalyst. Often it may be beneficial and desirable to have the concentration of the second component or promoter portion of the catalyst system, for example, iodide such as HI or $I_2$, in excess of that required to form a stoichiometric compound such as described above. In the same way the two components, e.g., an iridium compound and an iodine component are provided in a single molecule by beginning with iridium triiodide as the catalyst precursor for the reaction of an ethylenically unsaturated compound with carbon monoxide and water to produce an organic acid. The present discussion is based upon the catalyst precursors as charged. The ultimate nature of the catalyst as modified by reaction conditions, and the presence of promoters and reactants has not been completely elucidated. However, it has been found that the use of the components described herein provides a highly superior catalyst and process for the production of carboxylic acids.

Although any ratio of promoter portion or second component of the catalyst system may be employed, ratios of promoter portion to active portion expressed as atoms of halogen in the promoter portion to atoms of iridium in the active portion of the catalytic system in the range of 1:1 to 2500:1 are generally employed. However, the preferred range is 3:1 to 300:1 halogen atoms per iridium atom.

The liquid reaction medium employed may be any solvent compatible with the catalyst system and may include pure olefins or saturated or unsaturated hydrocarbons, e.g., benzene, decane, eicosane, etc. Mixtures thereof with the desired carboxylic acid and/or other carboxylic acids such as nonanoic acid may be used. The preferred solvent and liquid reaction medium for the process of this invention is a monocarboxylic acid having 2 to 20 carbon atoms, e.g., acetic, propionic, hexanoic, decanoic, dodecanoic, naphthoic, oleic and elaidic acids, including isomeric forms. Water may optionally be added to the reaction mixture in excess of the stoichiometric quantity discussed below.

The present invention is based upon the production of carboxylic acids by the transformation of an ethylenically unsaturated compound, having from 2 to 30 carbon atoms, and containing the structural unit.

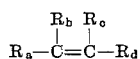

in heterocyclic, heteroaliphatic, aliphatic, acyclic, cyclic, or polycyclic hydrocarbon form, where $R_a$, $R_b$, $R_c$ and $R_d$ are moieties having from 0 to 20 carbon atoms and being selected from the group consisting of hydrogen, halogen, alkyl, alkene, aryl, cycloalkyl and cycloalkene moieties, the said hetero compounds being substituted with nitrogen, phosphorus, sulfur, halogen, or oxygen atoms.

Suitable feedstocks in the process of this invention are any ethylenically unsaturated compounds. Suitable compounds include ethylene, propylene, butene-1; butene-2; hexenes; octenes; dodecenes; hexadecene; 2-methylpropene; 1,3-butadiene; 2-methyl-1,3-butadiene; 2,3-dimethyl-1,3-butadiene; cyclohexene; methylcyclohexene; styrene; methylstyrene; vinylcyclohexene; 3,3-dimethyl-1-butene; 1,4-hexadiene; 2,4-hexadiene; 1,5-hexadiene; 2-methyl-1,4-hexadiene; acrolein; methyl vinyl ketone; allyl alcohol; 2-phenylbutene; cyclopentadiene; 2-cyclohexyl-butene; allene; allylamine; diallylamine; acrylonitrile, methyl acrylate; vinyl chloride; phosphopyruvic acid; and mixtures thereof.

Other suitable feedstocks include compounds having cyclic and polycyclic structures containing, in part, an ethylenically unsaturated linkage which may be converted to a carboxylic acid by the process of this invention. Examples of suitable cyclic structures include 1,5-cyclooctadiene; 1,5,9-cyclododecatriene; furan; 1,2-dithiol; pyrrole and

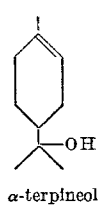

α-terpineol

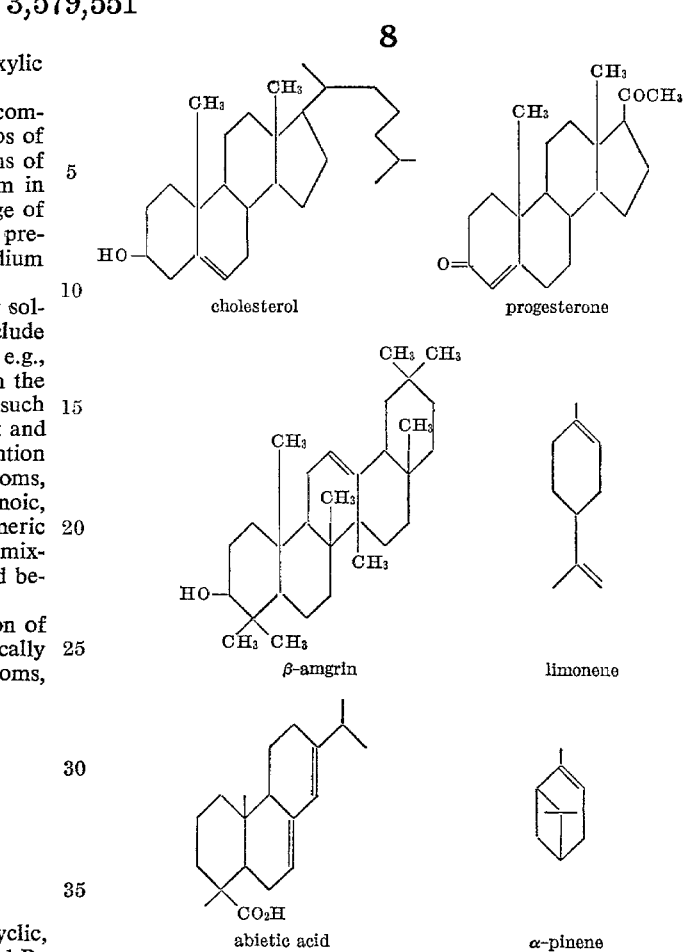

cholesterol progesterone

β-amgrin limonene abietic acid

α-pinene

In accordance with the present invention, the carbonylation reaction may be carried out by intimately contacting an ethylenically unsaturated compound, which depending on the carbon number and operating conditions, may either be in the vapor or liquid phase, with gaseous carbon monoxide and water (vapor or liquid) in a liquid phase containing the catalyst system prepared from $Na_2IrCl_4$ or other iridium precursor, preferably in the presence of iodine containing promoter, such as hydrogen iodide, under conditions of temperature and pressure suitable as described herein to form the carbonylation product. The particular conditions selected are the same whether the olefin is charged as a vapor or liquid. The temperature accordingly will be in the range of 50° C. to 300° C. with the preferred range being 125° C. to 225° C. Partial pressures of carbon monoxide of the order of 1 p.s.i.a. to 15,000 p.s.i.a. may be employed; however, 25 p.s.i.a. to 1,000 p.s.i.a. carbon monoxide partial pressure is generally preferred. Higher pressures may be used if desired under appropriate conditions.

Alternatively, carboxylic acids may be produced if desired via reaction of ethylenically unsaturated compounds with carbon monoxide and water in the vapor phase over the iridium containing catalyst systems described above, dispersed upon inert supports. Such a catalyst system may be operated as a conventional fixed bed catalytic reactor. For example, ethylene, aqueous hydrogen iodide, and carbon monoxide may be passed over a catalyst system consisting, for example, of $[Ir(CO)_2Cl]_2$ dispersed on an inert support material such as alundum, activated carbon, clays, alumina, silica-alumina, and ceramics, etc., in a fixed bed reactor maintained at elevated temperature and pressure, as described above, to produce propionic acid in high yields. However, use of a liquid reaction medium is preferred in the process of this invention using dissolved or dispersed active catalytic and promoter components.

A typical carbonylation reaction selective to carboxylic acid requires at least one mole of carbon monoxide and one mole of water per mole (equivalent) of ethylenically unsaturated linkage reacted. Excess of carbon monoxide and water over the aforesaid stoichiometric amounts, however, may be present. Carbon monoxide streams containing inert impurities such as carbon dioxide, methane, nitrogen, noble gases and paraffinic hydrocarbons having from 1 to 4 carbon atoms, may be employed, if desired, for example from an available plant gas stream, with no ill effect; however, in such cases total reactor pressure will have to be increased to maintain a desired carbon monoxide partial pressure. The concentration of carbon monoxide in the feed gas mixture is from 1 vol. percent to 99.9 vol. percent, a preferred range being from 10 vol. percent to 99.9 vol. percent.

The reaction rate is dependent upon catalyst concentration and temperature. Concentrations of the iridium compound or the first component of the catalyst system in the liquid phase, between $10^{-6}$ moles/liter and $10^{-1}$ moles/liter, are normally employed, with the preferred range being $10^{-4}$ moles/liter to $10^{-2}$ moles/liter. Higher concentrations even to the extent of 1 mole/liter may, however, be used if desired. Higher temperatures also favor higher reaction rates.

The concentration of the second component or promoter portion of the catalyst system may vary widely over the broad concentration range of $10^{-6}$ moles/liter to 18 moles/liter, based on halogen atom. In the process of this invention, however, the preferred concentration range of promoter is $10^{-4}$ moles/liter to 2 moles/liter of catalyst solution.

The active iridium catalytic component is preferably supplied as a catalyst solution. The solution can also include liquid reactants, products and mixtures thereof which function as solvents or reaction media.

The ethylenically unsaturated feedstock is normally charged with equimolar amounts of water, although more water may optionally be used. The use of ethylenically unsaturated linkage compounds in the above ratios is on the basis that at least a molar quantity of water is present equivalent to the number of moles of ethylenically unsaturated linkage reacted.

The iridium catalysts of the present invention are characterized by a high degree of specificity for the carbonylation reaction, e.g., the reaction of ethylenically unsaturated compounds with carbon monoxide and water to obtain carboxylic acids. Such control over the various competing reactions to obtain the carboxylic acid in high yield is surprising since other metal catalysts do not show such specificity. The iron group metals such as iron, cobalt and nickel differ from the present iridium catalysts in that the iron group metals also produce a number of oxygenated products such as alcohols, aldehydes and ketones in addition to carboxylic acid. Furthermore, the iron group catalysts, particularly cobalt and nickel, require a far higher carbon monoxide partial pressure to remain stable. When moderate pressures, e.g., less than about 2,000 p.s.i.a. carbon monoxide partial pressure are employed, at a temperature of 175° C., the cobalt and nickel catalysts are found to plate out or decompose to the free metal which plates on the walls of the reactor and is thus lost as a catalyst.

Another distinction of the iridium catalysts over the cobalt catalysts is the elimination of undesirable gaseous byproducts, including carbon dioxide and methane which are obtained as a result of the water-gas shift reaction which is strongly catalyzed by cobalt.

Another distinction of the present process over prior art processes is that hydrogen is not employed with the ethylenically unsaturated feedstock, and consequently aldehydes and alcohols are not produced as in hydroformylation processes.

The promoter function of the combination catalyst system of this invention may also be provided by a bromide moiety, which can be introduced as bromine or a compound thereof, such as $Br_2$, $HBr$, $CaBr_2$, etc.

For a better understanding of the process of the present invention specific embodiments of the process are presented below. These examples and illustrations are not to be construed in any way as limiting the scope of the invention.

EXAMPLE 1

A Hastelloy C batch reactor is charged with the following ingredients: 0.39 grams of an iridium compound having the formula $IR(CO)Cl(P\phi_3)_2$ as catalyst precursor; 12.2 ml. of a promotor component consisting of 47 wt. percent aqueous hydriodic acid (thereby providing a stoichiometric excess of water); 38 ml. of glacial acetic acid as solvent; and 14 grams of propylene having the structural formula $CH_2\!\!=\!\!CHCH_3$ as feedstock. The reactor is pressurized with carbon monoxide to a total pressure of 720 p.s.i.a., corresponding to a carbon monoxide partial pressure of about 300 p.s.i.a. at the reaction temperature of 175° C. The reaction is carried out at constant pressure.

The reaction mixture is subsequently analyzed by gas chromatographic techniques to yield a solution containing (solvent and catalyst-free bases):

24 ft. percent 2-iodopropane
63 wt. percent isobutyric acid
13 wt. percent n-butyric acid The selectivity to the desired carboxylic acid product (defined as moles of carboxylic acid/total moles of olefin and/or olefin derivative consumed ×100) is greater than 99 mol percent at substantially 80% conversion level. No other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

The above experiment is repeated in separate tests except that the iridium component is supplied from several different compounds (on a molar equivalent basis):

$[Ir(CO)_2Cl]_2$
$Ir(P\phi_3)_3H_3$
$Ir(CO)H(P\phi_3)_3$
$IrCl_3 \cdot 3H_2O$
$[\phi_4As^+][Ir(CO)_2Cl_2^-]$
$[\phi_4As^+][Ir(CO)_2I_2^-]$ (where $\phi$ is the phenyl group).

Similar reaction rates and product distributions are obtained in all instances, indicating that the various sources of iridium component give equivalent results.

When this experiment is conducted with the equivalent molar quantity of cobalt chlorine instead of iridium precursor as the catalyst, the selectivity and yield of the desired acid product are decreased significantly. It has been found that cobalt catalysts differ radically from iridium catalysts in that the cobalt catalysts also cause hydrogenation reactions such as hydrogenation of the desired carboxylic acid product to aldehydes and alcohols of the same number of carbon atoms. Consequently, the use of cobalt catalysts results in the substantial production of various undesirable by-products including higher carbon number alcohols, carboxylic acids, and derivatives.

Still another distinction of the iridium catalysts compared to the cobalt and nickel catalysts is the fact that significantly lower carbon monoxide partial pressures can be used without encountering catalyst decomposition.

EXAMPLES 2–15

The procedure of Example 1 is also followed in detailed Examples 2–15, in order to illustrate the variation of parameters.

TABLE

[Run conditions: [Ir] 5×10⁻³ M; [I] 0.6 M; 50 ml. solvent; Time: 17 hours]

| Feedstock | Catalyst Ir | Precursor promoter | Solvent | Temperature, °C. | Reactor pressure, p.s.i.g. | Major product selectivity (mol percent) |
|---|---|---|---|---|---|---|
| Example: | | | | | | |
| 2 — $H_2C=CH_2$ | $IrCl_3 \cdot 3H_2O$ | HI | $CH_3COOH$ | 150 | 600 | 85, propionic acid. |
| 3 — $CH_3(CH_2)_3CH=CH_2$ | $Ir(P\phi_3)_2COCl$ | $CH_3I$ | Same | 175 | 700 | 79, $C_7$ carboxylic acids. |
| 4 — $CH_2=CH(CH_2)_5CH_3$ | $Ir(P\phi_3)_3Cl$ | Same | $C_6H_6$ | 175 | 500 | 72, $C_9$ carboxylic acids. |
| 5 — $CH_3=CH-CH_3$ | $Ir(P\phi_3)_2(CO)I$ | do | $CH_2CH_2COOH$ | 145 | 600 | 95, $C_4$ carboxylic acids. |
| 6 — $CH_2(CH_2)_3CH=CH$ (cyclic) | $IrCl_3 \cdot 3H_2O$ | HI | $CH_3COOH$ | 175 | 700 | 91, cyclohexane carboxylic acid. |
| 7 — $CH_3(CH_2)_3CH=CH_2$ | $[Ir(CO)_2Cl]_2$ | HI | $H_2O$ | 175 | 400 | 75, $C_7$ carboxylic acids. |
| 8 — $CH_3(CH_2)_4-CH=CH-(CH_2)_4CH_3$ | $Ir(CO)H(P\phi_3)_3$ | $CaI_2 \cdot 3H_2O$ | $H_2O$ | 175 | 300 | 84, $C_{13}$ carboxylic acids. |
| 9 — $CH_2=CH(CH_2)_9CH_3$ | $[Ir(CO)_2Br]_2$ | HI | $CH_3CH_2COOH$ | 175 | 700 | 80, $C_{13}$ carboxylic acids. |
| 10 — $CH_2=CH-CH=CH_2$ | $(NH_4)_2IrCl_6$ | HI | $CH_3COOH$ | 165 | 600 | 81, $C_5$ carboxylic acids. |
| 11 — $(CH_3)_2C=CH_2$ | $Na_2IrBr_6$ | HI | Same | 175 | 700 | 10, $C_5$ carboxylic acids. |
| 12 — $CH_2(CH_2)_5CH=CH$ (cyclic) | $Ir(P\phi_3)_2(CO)Cl$ | HI | $C_6H_6$ | 140 | 300 | 66, cyclooctane carboxylic acid. |
| 13 — $CH_2=CH(CH_2)CH=CHCH_2CH_2$ (cyclic) | $[Ir(CO)_2Br]_2$ | HI | $CH_3(CH_2)_7COOH$ | 160 | 500 | 77, cyclooctane carboxylic acid. |
| 14 — $CH_2=CH(CH_2)_2CH=CH_2$ | $IrH_3(P\phi_3)_3$ | HI | Iso—$C_8H_{18}$ | 175 | 700 | 56, $C_7$ monocarboxylic acids. |
| 15 — Isomeric-$C_{12}$-olefins | $Ir(P\phi_3)_2(CO)Cl$ | HI | $CH_3(CH_2)_9COOH$ | 175 | 700 | 69, $C_{13}$ carboxylic acids. |

Data of these runs are shown in the accompanying table, including variation of catalyst components, feedstock, and reaction conditions along with results for product selectivity.

EXAMPLE 16

A solid supported catalyst containing an iridium component and an iodide promoter dispersed upon an inert support is prepared in the following manner: An amount of 0.3 g. of an iridium compound, having the formula $IrCl_3 \cdot 3H_2O$, is dissolved in 2-methoxyethanol. The solution is warmed to 95° C., and carbon monoxide is bubbled through the solution until a pale yellow color is obtained indicating the presence of the monovalent complex. Then the solution is cooled and 20 ml. of 57 wt. percent hydriodic acid is added to the solution of the iridium compound. Subsequently, the resulting solution is added to 20 ml. of an activate carbon (Pittsburgh Activated Carbon Co.). The excess solvent is evaporated using a rotary evaporator under vacuum. The resulting catalyst is vacuum dried at 60° C. for about 16 hours. The catalyst is then preheated in nitrogen at 200° C. for one hour.

Ten (10) ml. of the above supported catalyst is charged into an 18-inch Pyrex glass vertical reactor 30 mm. in diameter. The resulting catalyst bed, 2 cm. in depth, is covered with 100 ml. of inert packing as a preheater. Gaseous ethylene is supplied to the reactor and is subsequently converted to propionic acid at high selectivity. The process is conducted at a feed rate (moles per hour) of ethylene, 0.27; HI, 0.02; water, 0.28; and CO, 0.54. This feed mixture provides the water in a 3.7% molar excess relative to olefins. The pressure at which the gaseous reactants contact the supported catalyst is 500 p.s.i.a., corresponding to a carbon monoxide partial pressure of about 125 p.s.i.a. at a reaction temperature of 175° C.

The gaseous reactor effluent contains the desired carboxylic acid product, propionic acid, and unreacted ethylene, water, carbon monoxide and promoter. The selectivity of ethylene conversion to propionic acid is virtually quantitative.

EXAMPLE 17

A glass lined reactor is charged with the following ingredients: 0.39 grams of an iridium compound having the formula $Ir(Co)Cl(P\phi_3)_2$, as catalyst precursor; 12 ml. of water and a promoter component consisting of 8.5 grams of elemental iodine; 38 ml. of glacial acetic acid as solvent and 33 grams of hexene-1 having the structural formula $CH_2=CH(CH_2)_3CH_3$ as feedstock.

The reactor is pressurized with carbon monoxide to a total pressure of 700 p.s.i.a., corresponding to a carbon monoxide partial pressure of about 600 p.s.i.a. at the reaction temperature of 175° C. The reaction is carried out at constant pressure.

The reaction mixture is subsequently analyzed by gas chromatographic techniques to yield a solution containing greater than 75 wt. percent $C_7$ carboxylic acids. When the above experiment is repeated in separate tests employing as the catalyst precursor and promoter component (added as equivalent molar quantities) the following compounds:

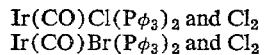

$Ir(CO)Cl(P\phi_3)_2$ and $Cl_2$
$Ir(CO)Br(P\phi_3)_2$ and $Cl_2$ no carbonylation reaction, yielding carboxylic acid products occurs.

EXAMPLE 18

A batch reactor is charged with the following ingredients: 0.39 grams of an iridium compound having the formula $Ir(CO)Cl(P\phi_3)_2$, as catalyst precursor; 18.3 grams of a promoter component consisting of 47 wt. percent aqueous hydriodic acid, 38 ml. of glacial acetic acid as solvent and 40 grams of 1,5,9-cyclododecatriene as feedstock.

The reactor is pressurized with carbon monoxide to a total pressure of 500 p.s.i.a., corresponding to a carbon monoxide partial pressure of about 415 p.s.i.a. at the reaction temperature of 140° C. The reaction is carried out at constant pressure.

The reaction mixture is subsequently analyzed by gas chromatographic techniques to yield a solution containing (solvent and catalyst-free bases):

6 wt. percent unreacted olefin feedstock
12 wt. percent intermediates and others
82 wt. percent cyclododecane carboxylic acid The selectivity to the desired carboxylic acid product is greater than 95 mol. percent at substantially 85% conversion level.

EXAMPLE 19

A batch reactor is charged with the following ingredients: 0.27 grams of iridium compound having the formula IrCl$_3$·3H$_2$O, as catalyst precursor; 1.0 ml. of a promotor component consisting of 57 wt. percent aqueous hydriodic acid; 41.2 ml. of glacial acetic acid and 8 ml. H$_2$O as solvent; and 33.6 grams of hexene-1 having the structural formula H$_2$C=CH(CH$_2$)$_3$CH$_3$ as feedstock.

The reactor is pressurized with carbon monoxide to a total pressure of 700 p.s.i.a., corresponding to a carbon monoxide partial pressure of about 600 p.s.i.a. at the reaction temperature of 175° C. The reaction is carried out at constant pressure.

The reaction mixture is subsequently analyzed by gas chromatographic techniques to yield a solution containing (solvent and catalyst-free bases):

22 wt. percent hexenes
33 wt. percent miscellaneous intermediates
20 wt. percent n-heptanoic acid
25 wt. percent branched C$_7$ carboxylic acids The selectivity to the desired carboxylic acid product (defined as moles of carboxylic acid/total moles of olefin and/or olefin derivative consumed×100) is greater than 90 mol percent at substantially 50% conversion level. No other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

When the above experiment is repeated in a separate test except initially employing 0.6 ml. of 37% hydrochloric acid (an equivalent molar ratio of Cl$^-$ to I$^-$), no carbonylation reaction occurs as determined by gas chromatographic analysis of reaction mixture and carbon monoxide gas consumption data. When, after about 2 hours and no reaction has occurred, 1.0 ml. of HI is injected into the reactor, reaction begins immediately with no induction period as determined by carbon monoxide gas consumption. Subsequent analysis of the reaction mixture gives a product distribution similar to that above.

These results demonstrate that HCl is not effective as the promoter portion of the catalyst system of this invention.

What is claimed is:

1. A process for the transformation of an ethylenically unsaturated compound, having from 2 to 30 carbon atoms, and containing the structural unit

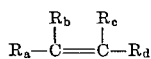

in aliphatic, acyclic, or cycloaliphatic form, where R$_a$, R$_b$, R$_c$ and R$_d$ are moieties having from 0 to 20 carbon atoms and are selected from the group consisting of hydrogen, halogen, alkyl, alkene, aryl, cycloalkyl and cycloalkene moieties, to obtain a carboxylic acid, which comprises contacting the said compound with carbon monoxide and water in the presence of an iridium compound, and an iodide promoter at a temperature of from 50° C. to 300° C.

2. A process as in claim 1 in which the said promoter is hydrogen iodide.

3. A process as in claim 1 in which the partial pressure of carbon monoxide is from 1 p.s.i.a. to 15,000 p.s.i.a.

4. A process as in claim 1 in which the partial pressure of carbon monoxide is from 5 p.s.i.a. to 3,000 p.s.i.a.

5. A process as in claim 1 in which the partial pressure of carbon monoxide is from 25 ps.i.a. to 1,000 p.s.i.a.

6. A process as in claim 1 in which the said iridium compound is an iridium halide.

7. A process as in claim 1 in which the said iridium compound is an iridium carbonyl halide.

8. A process as in claim 1 in which the said iridium compound is iridium trichloride.

9. A process as in claim 1 in which the said iridium compound is iridium triiodide.

10. A process as in claim 1 in which the said iridium compound contains carbon monoxide and at least one iodine ligand.

11. A process as in claim 1 in which the said iridium compound is an aryl phosphine complex of iridium.

12. A process as in claim 1 in which the said iridium compound contains carbon monoxide and at least one halogen ligand selected from the group consisting of chlorine, bromine, and iodine; and at least two ligands selected from the group consisting of phosphorus, arsenic and antimony derivatives having aryl radicals of from 6 to 18 carbon atoms.

13. A process for the transformation of an ethylenically unsaturated compound, having from 2 to 30 carbon atoms, and containing the structural unit

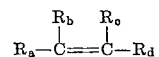

in aliphatic, acyclic, or cycloaliphatic form, where R$_a$, R$_b$, R$_c$ and R$_d$ are moieties having from 0 to 20 carbon atoms and are selected from the group consisting of hydrogen, halogen, alkyl, alkene, aryl, cycloalkyl and cycloalkene moieties, to obtain a carboxylic acid, which comprises contacting the said compound with carbon monoxide and water, in the presence of a solution containing an iridium compound, and an iodide promoter, at a temperature of from 50° C. to 300° C. and at a carbon monoxide partial pressure of 1 p.s.i.a. to 15,000 p.s.i.a.

14. A process for the manufacture of carboxylic acids which comprises contacting an ethylenically unsaturated feedstock of from 2 to 30 carbon atoms with carbon monoxide and water, in the presence of a solution containing an iridium compound, and an iodide promoter at a temperature of from 125° C. to 250° C.

15. A process as in claim 13 in which the said compound feedstock is comprised of an olefin having from 10 to 20 carbon atoms, and the product comprises a monocarboxylic acid.

16. A process as in claim 13 in which the said compound feedstock is comprised of a mixture of olefins having from 10 to 20 carbon atoms, and the product is comprised of monocarboxylic acids.

17. A process as in claim 13 in which the said compound feedstock comprises a cyclic hydrocarbon of 6 to 12 carbon atoms, and which contains from 1 to 3 ethylenically unsaturated structural units, and the product comprises a monocarboxylic acid derivative of the said cyclic hydrocarbon.

18. A process as in claim 13 in which the said promoter is hydrogen iodide.

19. A process as in claim 13 in which the said iridium compound is an iridium halide.

20. A process as in claim 13 in which the said iridium compound is an iridium carbonyl halide.

21. A process as in claim 13 in which the said iridium compound is iridium trichloride.

22. A process as in claim 13 in which the said iridium compound is iridium triiodide.

23. A process as in claim 13 in which the said feedstock is ethylene and the product is propionic acid.

24. A process as in claim 13 in which the said iridium compound contains carbon monoxide and at least one iodine ligand.

25. A process for the transformation of an ethylenically unsaturated compound, having from 2 to 30 carbon atoms, and containing the structural unit

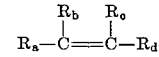

in aliphatic, acyclic, or cycloaliphatic form, where R$_a$, R$_b$, R$_c$ and R$_d$ are moieties having from 0 to 20 carbon atoms and are selected from the group consisting of hydrogen, halogen, alkyl, alkene, aryl, cycloalkyl and cycloalkene moieties, to obtain a carboxylic acid, which comprises contacting the said compound with carbon monoxide and water, in the vapor phase, in the presence of an iridium compound, and an iodide promoter, at a temperature of from 50° C. to 300° C. and at a carbon monoxide partial pressure of 1 p.s.i.a. to 15,000 p.s.i.a.

26. A process for the transformation of an ethylenically unsaturated compound to obtain a carboxylic acid, which comprises contacting the said compound with carbon monoxide and water in the presence of an iridium compound and an iodide promoter at a temperature of from 50° C. to 300° C.

27. A process for the transformation of ethylene to obtain propionic acid, which comprises contacting the said ethylene with carbon monoxide and water in the presence of an iridium compound, and an iodide promoter at a temperature of from 50° C. to 300° C.

References Cited

UNITED STATES PATENTS

| 2,710,879 | 6/1955 | Snyder | 260—532 |
|---|---|---|---|
| 3,065,242 | 11/1962 | Alderson et al. | 260—343.6 |
| 3,168,553 | 2/1965 | Slaugh | 260—497 |
| 3,409,649 | 11/1968 | Keblys et al. | 260—413 |

ELBERT L. ROBERTS, Primary Examiner

E. G. LOVE, Assistant Examiner

U.S. Cl. X.R.

260—313.1, 332.2, 346.1, 397.1, 514, 533